Dec. 1, 1959  A. J. J. POELMAN  2,915,426
FILTER DEVICE AND METHOD FOR MAKING A FILTER DEVICE
Filed Sept. 11, 1956  2 Sheets-Sheet 1

INVENTOR:
Armand Jacques Julien Poelman
BY: Michael S. Striker
    Agt.

2,915,426

FILTER DEVICE AND METHOD FOR MAKING A FILTER DEVICE

Armand Jacques Julien Poelman, Paris, France

Application September 11, 1956, Serial No. 609,310

Claims priority, application France February 1, 1954

7 Claims. (Cl. 154—93)

The present invention relates to a filter device and a method for making a filter device, and more particularly to an accordion-folded filter sheet device. This application is a continuation-in-part of my prior application Serial No. 483,146, filed January 20, 1955, now abandoned.

In filter devices made according to the prior art, the effective filtration surface of the filter sheet is considerably reduced in order to maintain the individual folds of the accordion-shaped filter sheet spaced apart so that materials to be filtered can pass through them.

Known methods for making such filter devices are slow and costly and do not produce filter devices which permit maximum filtration through the folded filter sheets.

It is an object of the present invention to avoid the disadvantages inherent in the filter devices of the prior art and in the methods for preparing such devices.

Filter sheets of filter equipment require replacement as soon as the surfaces of the sheet are covered by filtered-out particles which prevent further filtration. It is thus very important that filter sheet devices provide a maximum of filtration surface to prolong the effective filtration time of each device. It is an object of the present invention to provide a long-wearing filter device which can be inexpensively manufactured by the method of the invention to reduce cost of maintenance and upkeep of filter equipment.

It is a further object of the present invention to provide an accordion-shaped filter device which retains its shape and the effective spacing of its folds throughout the life of the device.

It is a further object of the invention to provide spacing elements for an accordion-shaped filter sheet device which are substantially unaffected by the particles filtered out of the material passing through the device so that the accordion-folds of the sheet remain properly spaced apart during use.

It is a further object of the invention to provide a filter sheet which can be folded easily and quickly into an accordion-shape and which retains the accordion-shape during handling and use.

Yet another object of the invention is to provide an accordion-shaped filter device the folded sheets of which are securely spaced apart to resist pressure of filtered materials which tends to force the faces of adjacent sheets together so as to avoid that the device is rendered useless even though the sheets themselves are not yet covered by filtered particles.

It is another object of the present invention to produce by an improved method a filter device having greatly increased effective filtration surface area.

It is another object of the present invention to provide a method of making accordion-shaped filter devices which is simpler, faster and much less costly than those of the prior art.

It is another object of the present device to provide a method which requires less complex and less expensive equipment for manufacturing a sturdy, serviceable and inexpensive filter device than was required in the prior art methods.

Another object of the invention is to produce an accordion-shaped filter device in which the filtering efficiency of the folded filter sheet is not substantially lessened in order to maintain the folds spaced apart.

Still another object of the invention is to eliminate the need for specially treated filter sheet by applying to the face of ordinary filter sheet means which maintain the folds of an accordion-shaped filter device in the proper spaced relationship throughout the life of the filter device.

With the above objects in view one aspect of the present invention mainly consists in a method of preparing a filter sheet in which a filter sheet is moved continuously in one direction past an application station where there are applied and secured to at least one face of the sheet a plurality of elongated spacing elements extending in the direction of movement of the sheet and spaced from each other in a direction transverse to that direction and in which the sheet with the spacing elements thereon is folded alternately along transverse fold lines in opposite directions to form an accordion-shaped filter having adjacent folds spaced apart by the spacing elements.

Another aspect of the present invention consists in a filter device comprising a filter sheet and a plurality of elongated spacing elements adhesively connected to at least one face thereof, the spacing elements extending along the sheet in one direction and being spaced apart in a direction transverse thereto. When the filter sheet is folded alternately along transverse fold lines in opposite directions to form accordion-folds therein, the spacing elements maintain adjacent accordion-folds spaced apart.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
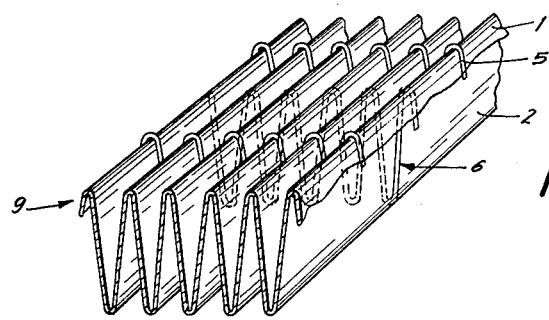
Fig. 1 is a fragmentary perspective view of a filter device according to one embodiment of the present invention.

With reference to the drawings, the filter device 9 includes a filter sheet 8 having spacing means 6 secured to the faces thereof. The spacing means include a first set of elongated spacing elements 3 connected to face 1 of the sheet and a second set of elongated spacing elements 4 connected to face 2 of the sheet.

The spacing elements of each set extend along the sheet in one direction and are spaced apart from each other in a direction transverse thereto.

Figure 2:
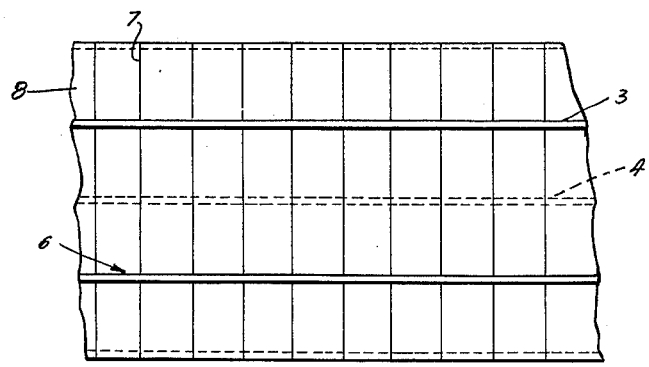
Fig. 2 is a fragmentary plan view illustrating a filter sheet according to the present invention.

In the embodiments illustrated in Figs. 1 and 2 the spacing elements of one set are staggered with respect to the spacing elements of the other set.

The spacing elements 3 and 4 in one embodiment of the invention are formed by trackings of adhesive on the respective faces of the sheet 8, as shown in Fig. 2.

In another embodiment of the invention the spacing elements comprise fiber strands 5 adhesively connected to the respective faces of the sheet 8, as shown in Fig. 1.

When the sheet with the spacing elements 3 and 4 connected to the faces thereof is folded alternately along transverse fold lines 7 in opposite directions to form an accordion-shaped filter device, the spacing elements 3 and 4 maintain the folds of the device spaced apart from each other to permit effective use of the filter surfaces of the sheet 8.

In one method of making a filter device according to the present invention, the sheet 8 is brought in contact with application stations where the trackings of adhesive material are formed on the faces thereof.

Figure 3:
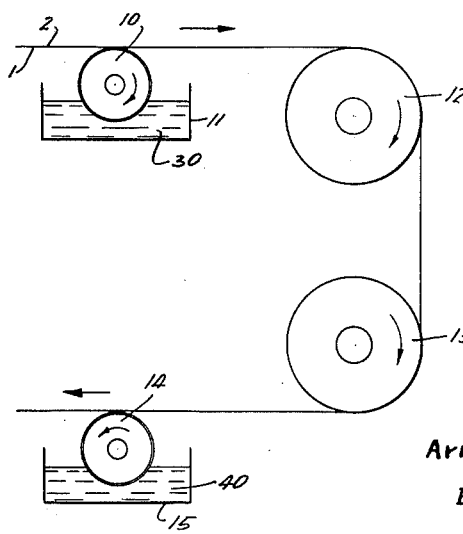
Fig. 3 is a schematic side view partly in section illustrating a method of making a filter device according to the present invention.

As illustrated in Fig. 3, the first application station includes a vat 11 containing an adhesive 30 in which a drum 10 having a plurality of annular projections spaced in axial direction on the periphery thereof rotates to pick up a quantity of adhesive and apply it to the face 1 of the sheet as it passes to form a plurality of trackings thereon.

The sheet travels along a pair of spaced guide rolls 12 and 13 and past the second application station having a vat 15 containing an adhesive 40. A drum 14 picks up adhesive for application to the face 2 of the sheet. The drum 14 has annular projections which are spaced apart in axial direction in such a manner that the trackings 4 formed thereby are staggered with respect to the trackings 3 formed on the first face of the sheet.

After the trackings are formed on the faces of the sheet, they are permitted to dry or set to the degree required to render the trackings sufficiently hard to resist flattening against the face of the sheet to which they are connected. The sheet with the trackings thereon is then alternately folded along transverse fold lines 7 in opposite directions to obtain an accordion-shaped filter similar to the device shown in Fig. 1 and having adjacent accordion-folds spaced apart by the trackings 3 and 4.

Figure 4:
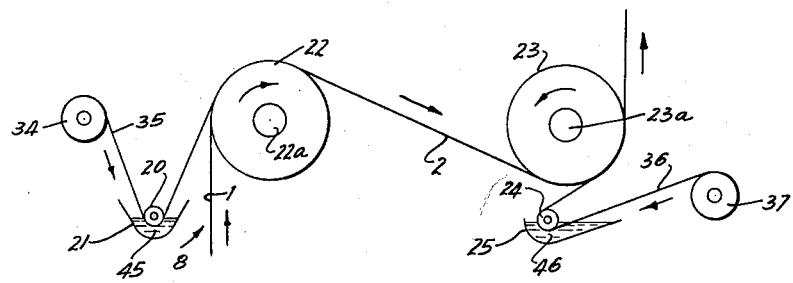
Fig. 4 is a schematic side view partly in section illustrating a modification of the method of the present invention.

In the modification of the method of the invention illustrated in Fig. 4, the sheet travels along a pair of spaced guide rolls 22 and 23 respectively rotating in opposite directions on parallel axes 22a and 23a. A first set 35 of fiber strands 5 travel from a supply means 34 along a guide roller means 20, which rotates in an adhesive 45 contained in a vat 21, and thence along the face 1 of the sheet as it passes along guide roll 22 where the fiber strands are adhesively connected to face 1 of the sheet.

A second set 36 of fiber strands 5, moving from a supply means 37 through an adhesive 46 in a vat 25 along a guide means 24 and past guide roll 23 are adhesively attached to face 2 of the sheet as it moves along guide roll 23.

After the sets 35, 36 of fiber strands 5 have been applied to the respective faces 1 and 2 of the sheet 8, the sheet is folded along fold lines 7 in zig-zag fashion to form an accordion-shaped filter device 9, as shown in Fig. 1. The fiber strands 5 connected to the sheet 8 maintain the folds of the filter device spaced apart during handling, and use of the filter device with the result that there is obtained a maximum of filtration effect from each device.

Fig. 2 illustrates the filter sheet 8 before the folding and it will be understood that the two sets of spacing elements 3 and 4 are, in one embodiment of the present invention, adhesive trackings applied by the method illustrated in Fig. 3, and are, according to another embodiment of the present invention, fiber strands 5 adhesively connected to the sheet 8 by the method illustrated in Fig. 4.

While Fig. 1 illustrates a filter device according to the embodiment of the present invention employing fiber strands 5, it will be understood that the embodiment of the present invention in which adhesive trackings are used as spacing elements 6 will have a similar appearance.

Figure 5:
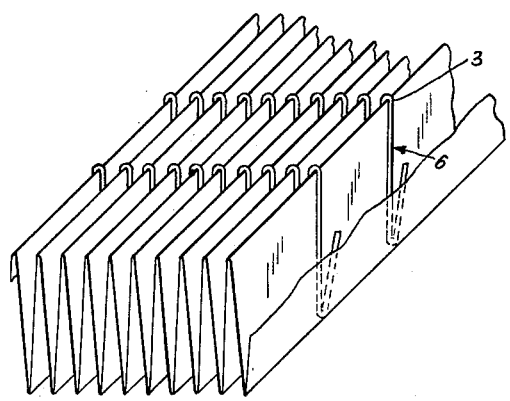
Fig. 5 is a fragmentary perspective view of a modified filter device according to the present invention.

In Fig. 5 there is shown a modified filter device according to the present invention in which the set of spacing elements 3 is applied to only one face of the sheet 8. When the sheet 8 is folded to form the accordion-shaped filter device 9, the set of spacing elements maintains every second fold of the sheet spaced apart.

It will be understood that each of the elements described above, or two or more together, may also find a useful application in other types of filter devices differing from the types described above.

While the invention has been illustrated and described as embodied in accordion-shaped filter device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of preparing an accordion-folded filter, comprising, in combination, the steps of continuously moving in one direction a filter sheet past an application station; at said application station providing at least one face of said sheet with a plurality of elongated spacing elements each formed by a raised bead of adhesive extending in said direction and being spaced from each other in a direction transverse to said direction; drying said beads of adhesive and thereby causing said elements to be permanently bonded to said sheet; and alternately folding said filter sheet and said spacing elements along transverse fold lines in opposite directions to obtain an accordion-shaped filter having adjacent accordion folds spaced apart by the raised beads of adhesive.

2. A method of preparing an accordion-folded filter, comprising, in combination, the steps of continuously moving in one direction a filter sheet past two spaced application stations, each of said stations being associated with one face of said filter sheet respectively; at said application stations providing each of the respective faces of said filter sheet with a set of elongated spacing elements extending in said direction by causing said elements to be permanently bonded through an adhesive to said sheet, said elements being spaced from each other on the respective faces in a direction transverse to said direction; and alternately folding said filter sheet along transverse fold lines in opposite directions to obtain an accordion-shaped filter having adjacent accordion folds spaced apart by the spacing elements on both its faces.

3. A method of preparing an accordion-folded filter, comprising, in combination, the steps of continuously moving in one direction a filter sheet past two spaced application stations, each of said stations being associated with one face of said filter sheet respectively; at said application stations providing each of the respective faces of said filter sheet with a set of fiber spacing elements extending in said direction by causing said elements to be permanently bonded through an adhesive to said sheet, said elements being spaced from each other on the respective faces in a direction transverse to said direction; and alternately folding said filter sheet along transverse fold lines in opposite directions to obtain an accordion-shaped filter having adjacent accordion folds spaced apart by the fiber strands on both its faces.

4. A method of preparing an accordion-folded filter, comprising, in combination, the steps of continuously moving in one direction a filter sheet past two spaced application stations, each of said stations being associated with one face of said filter sheet respectively; at said application stations providing each of the respective faces of said filter sheet with a set of elongated spacing elements each formed by a raised bead of adhesive extending in said direction and being spaced from each other on the respective faces in a direction transverse to said direction; drying said beads of adhesive and thereby causing said elements to be permanently bonded to said sheet; and alternately folding said filter sheet along transverse fold lines in opposite directions to obtain an accordion-shaped filter having adjacent accordion folds spaced apart by the raised beads of adhesive on both its faces.

5. A method of preparing an accordion-folded filter, comprising, in combination, the steps of continuously moving in one direction a filter sheet past a first application station and past a second application station; at said first application station providing one face of said sheet with a first set of elongated spacing elements extending in said direction by causing said elements to be permanently bonded through an adhesive to said sheet, said elements being spaced from each other in a direction transverse to said direction and at said second application station providing the other face of said sheet with a second set of elongated spacing elements extending in said direction by causing said elements to be permanently bonded through an adhesive to said sheet, said elements being spaced from each other and staggered with respect to respective spacing elements of said first set in said transverse direction; and alternately folding said filter sheet along transverse fold lines in opposite directions to obtain an accordion-shaped filter having adjacent accordion folds spaced apart by the spacing elements on both its faces.

6. A method of preparing an accordion-folded filter, comprising, in combination, the steps of continuously moving in one direction a filter sheet past a first application station and past a second application station; at said first application station providing one face of said sheet with a first set of fiber strand elements extending in said direction by causing said elements to be permanently bonded through an adhesive to said sheet, said elements being spaced from each other in a direction transverse to said direction and at said second application station providing the other face of said sheet with a second set of fiber strand elements extending in said direction by causing said elements to be permanently bonded through an adhesive to said sheet, said elements being spaced from each other and staggered with respect to respective fiber strand elements of said first set in said transverse direction; and alternately folding said filter sheet along transverse fold lines in opposite directions to obtain an accordion-shaped filter having adjacent accordion folds spaced apart by fiber strand elements on both its faces.

7. A method of preparing an accordion-folded filter, comprising, in combination, the steps of continuously moving in one direction a filter sheet past a first application station and past a second application station; at said first application station providing one face of said sheet with a first set of elongated spacing elements each formed by a raised bead of adhesive extending in said direction and being spaced from each other in a direction transverse to said direction and at said second application station providing the other face of said sheet with a second set of elongated spacing elements each formed by a raised bead of adhesive extending in said direction and being spaced from each other and staggered with respect to respective spacing elements of said first set in said transverse direction; drying said beads of adhesive and thereby causing said elements to be permanently bonded to said sheet; and alternately folding said filter sheet along transverse fold lines in opposite directions to obtain an accordion-shaped filter having adjacent accordion folds spaced apart by the raised beads of adhesive on both its faces.

References Cited in the file of this patent

UNITED STATES PATENTS

| 1,770,854 | Johnson | July 15, 1930 |
| 1,780,732 | Young | Nov. 4, 1930 |
| 2,397,759 | Sigmund | Apr. 2, 1946 |
| 2,569,243 | Kovacs | Sept. 25, 1951 |

FOREIGN PATENTS

| 745,466 | France | Feb. 21, 1933 |
| 1,111,568 | France | Nov. 2, 1955 |
| 295,379 | Switzerland | Mar. 1, 1954 |